United States Patent [19]

Torrington et al.

[11] 4,225,141
[45] Sep. 30, 1980

[54] MECHANISM FOR AIDING CARRIAGE RETURN IN VIDEO DISC PLAYER

[75] Inventors: Leslie A. Torrington; Larry D. Huff, both of Indianapolis, Ind.

[73] Assignee: RCA Corporation, New York, N.Y.

[21] Appl. No.: 964,526

[22] Filed: Nov. 29, 1978

[51] Int. Cl.³ ............................................. G11B 25/04
[52] U.S. Cl. .................................. 274/9 B; 274/13 R
[58] Field of Search ........................... 358/128; 360/97; 274/9 R, 9 B, 13 R, 14, 15 R, 23 A

[56] References Cited

U.S. PATENT DOCUMENTS

| 3,409,746 | 11/1968 | Skov et al. | 360/97 |
| 4,113,262 | 9/1978 | DeStephanis | 358/128 |

FOREIGN PATENT DOCUMENTS

| 538149 | 3/1957 | Canada | 274/9 B |

Primary Examiner—John W. Shepperd
Attorney, Agent, or Firm—E. M. Whitacre; J. S. Tripoli; D. A. Kulkarni

[57] ABSTRACT

A video record player includes a common drive belt for selectively translating a pickup stylus carriage. The player is equipped with a first drive mechanism, including a turntable-driven pulley, for utilizing the common drive belt for translating the carriage during playback toward the center of a turntable at a speed correlated to the speed of rotation of the turntable while stylus/record engagement is effected. The first drive mechanism includes a slip clutch interposed between the common drive belt and the turntable-driven pulley. In such players, a record caddy is used to push the carriage back to a starting position away from the turntable center, when it is at a position other than at the starting position during a caddy insertion into the player. A mechanism is provided for rendering the slip clutch disabled during a caddy insertion, whereby restoration of the carriage to the starting position can be effected with freedom from interference by the first drive mechanism, when the carriage is at a position other than at the starting position during such a caddy insertion.

9 Claims, 13 Drawing Figures

MECHANISM FOR AIDING CARRIAGE RETURN IN VIDEO DISC PLAYER

This invention generally relates to video disc players, and more particularly, it pertains to players suitable for use with a record bearing caddy.

In certain video disc systems, information is stored on a disc record in the form of geometric variations in the bottom of a continuous spiral groove disposed on the record surface. The variations in capacitance between an electrode incorporated in a groove-riding stylus and a conductive coating disposed on the record surface are sensed to reproduce the stored information. A capacitance-type video disc system is illustratively disclosed in U.S. Pat. No. 3,842,194 (Clemens).

In such systems, it is advantageous to mount a groove-riding pickup stylus in a demountable cartridge. The player is provided with rails for guiding a carriage, having a compartment for receiving the pickup cartridge, along a path. The carriage is driven during playback along the carriage guiding rails in correlation with the motion of the groove-riding stylus. U.S. Pat. No. 3,870,320 (Torrington), discloses a type of carriage translating system.

It is beneficial to enclose a record in a thin plastic caddy. For record loading, an occupied caddy is inserted into an input slot provided in the player. The player is equipped with another set of rails for guiding caddy insertion along a further path. A record extracting mechanism disposed in the player removes the record from the caddy during subsequent caddy withdrawal, whereby the record is retained in the player. The player is equipped with a platform for supporting the retained record when it is disposed in an elevated position. The retained record is transferred to the turntable for playback during motion of the platform to a depressed position. For subsequent record retrieval, the platform, with the retained record resting thereon, is raised, and an empty caddy is inserted into the player, thereby returning the record back into the caddy. Withdrawal of the caddy, effects record removal from the player. U.S. Pat. No. 4,098,511 (Leedom), and patent applications, Ser. Nos. 747,729 (Coleman), now U.S. Pat. No. 4,124,866, and 801,604 (Torrington), now U.S. Pat. No. 4,133,540, illustrate systems suitable for use with a record caddy. The above patent and applications are assigned of record to the assignee of the instant application.

In such systems, the carriage is typically mounted for side-to-side motion and the direction of caddy insertion is from front-to-back, a direction which is orthogonal to the carriage path. Such configuration imposes several constraints on player design and construction: for example, it is necessary that the starting position of the carriage is beyond the record periphery, one of the caddy guiding rails is mounted on the carriage to prevent interference thereof with the motion of the carriage toward the record center; a separate mechanism is needed to return the carriage to the starting position subsequent to playback; and a stylus landing adjustment mechanism is necessary to insure that the stylus is lowered precisely over the beginning of the recorded band during travel of the carriage from an offrecord starting position toward a position overlying the record.

In a concurrently filed, copending application, Ser. No. 964,531, of L. A. Torrington, entitled "VIDEO DISC PLAYER", a novel video disc player construction, which overcomes the hereinbefore mentioned constraints, is disclosed. In the therein disclosed system, the carriage is translated along a path disposed substantially parallel to the path of caddy insertion. Pursuant to a further feature of the Torrington invention, the direction of translation of the carriage during playback is opposite to the direction of the caddy insertion. The location of the caddy path relative to the carriage path is such that the caddy engages the carriage, when the carriage is at a position other than at a starting position, during a caddy insertion to reset the carriage at the starting position. The Torrington application is assigned of record to the assignee of the instant application.

In video disc players of the type mentioned above, it is desirable to provide active disc searching, as well as special effect features (such as, stop motion, fast forward and reverse motion). In a concurrently filed, copending U.S. patent application Ser. No. 964,534, of F. R. Stave and entitled "VIDEO DISC PLAYER HAVING MANUAL SCAN FACILITY", a carriage translating apparatus for providing active searching and special effects is described. The therein disclosed carriage translating apparatus includes a unidirectional play belt for translating the carriage toward the turntable center at a speed correlated to the turntable rotational speed, a bidirectional search belt for translating the carriage toward and away from the turntable center at a speed independent of the turntable rotational speed, and a selectively actuated apparatus for clamping one of the two belts to the carriage to effect carriage translation by a selected one of the belts to the exclusion of the other of the belts.

In a concurrently filed copending U.S. patent application Ser. No. 964,530, of L. A. Torrington and entitled "MANUAL SCANNING MECHANISM FOR VIDEO DISC PLAYER", a modified carriage translating apparatus is described for providing manual searching and special effects without the need for two separate play and search belts and without the need for clamping and unclamping the belts. Pursuant to the Torrington invention, a common drive belt, fixedly secured to the carriage, is provided. The player is equipped with a first drive mechanism, including a turntable-driven pulley, for utilizing the common drive belt for translating the carriage during playback toward the turntable center at a speed correlated to the turntable speed. A second drive mechanism is employed for utilizing the common drive belt for translating the carriage during active scanning toward and away from the turntable center at a speed independent of the turntable rotational speed. The first drive mechanism incorporates a slip clutch interposed between a pulley which drives the common drive belt and the turntable-driven pulley, whereby wresting of control of the common drive belt by the second drive mechanism from the first drive mechanism is permitted by the slip clutch upon actuation of the second drive mechanism.

In such players, the record caddy is used to reset the carriage back to the starting position when the carriage is at a position other than at the starting position during a caddy insertion. The caddy must overcome the inertia of the carriage translating mechanism during such a carriage return to the starting position. In accordance with the instant invention, a mechanism is provided for rendering the slip clutch disabled during a caddy insertion, whereby resetting of the carriage to the starting position can be effected without interference from the first carriage drive mechanism, when the carriage is at a position other than at the starting position during such a caddy insertion.

Figure 1:
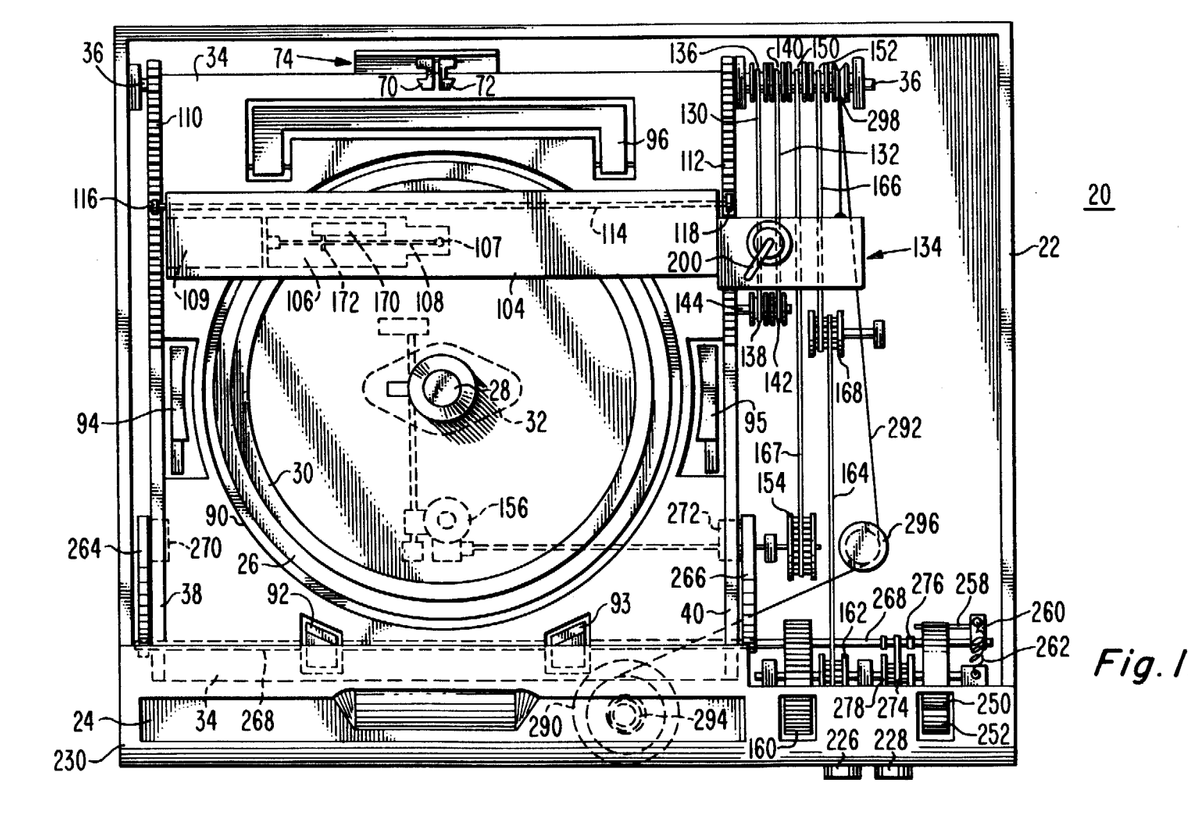
FIG. 1 is a plan view of a video record player incorporating the cartridge translating apparatus of the aforesaid Stave application.
Figure 2:
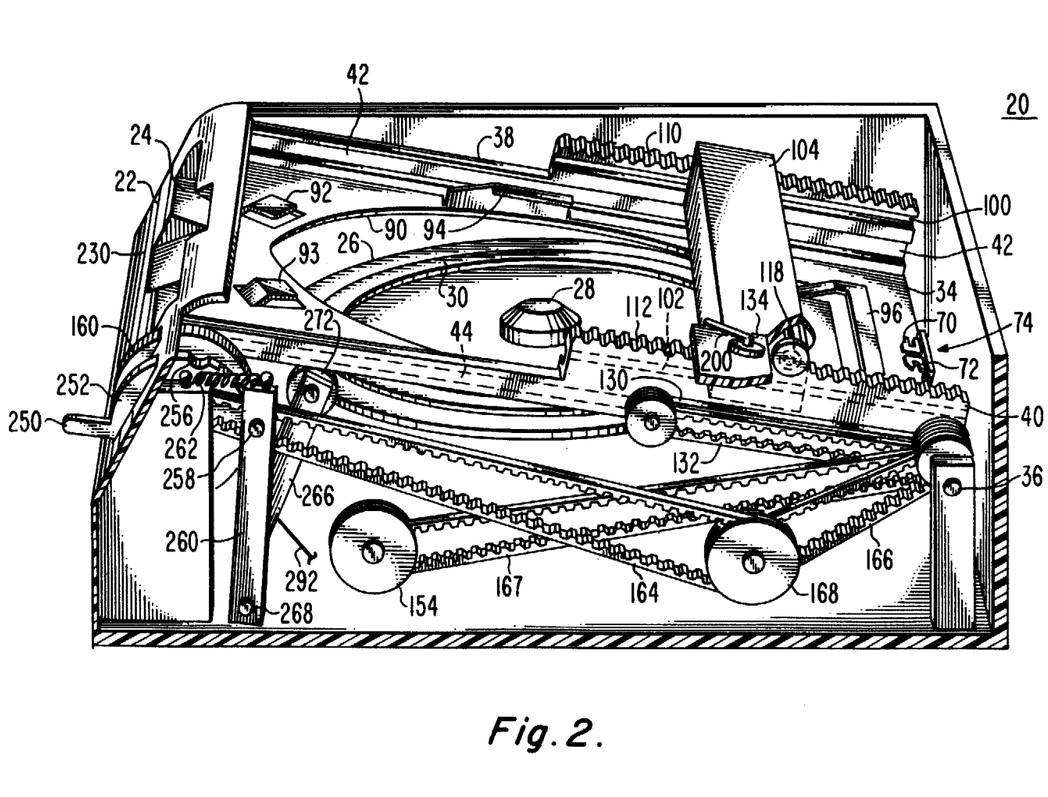
FIG. 2 is a perspective end view of the player of FIG. 1, with a depressible platform being shown in the raised position.
Figure 3:
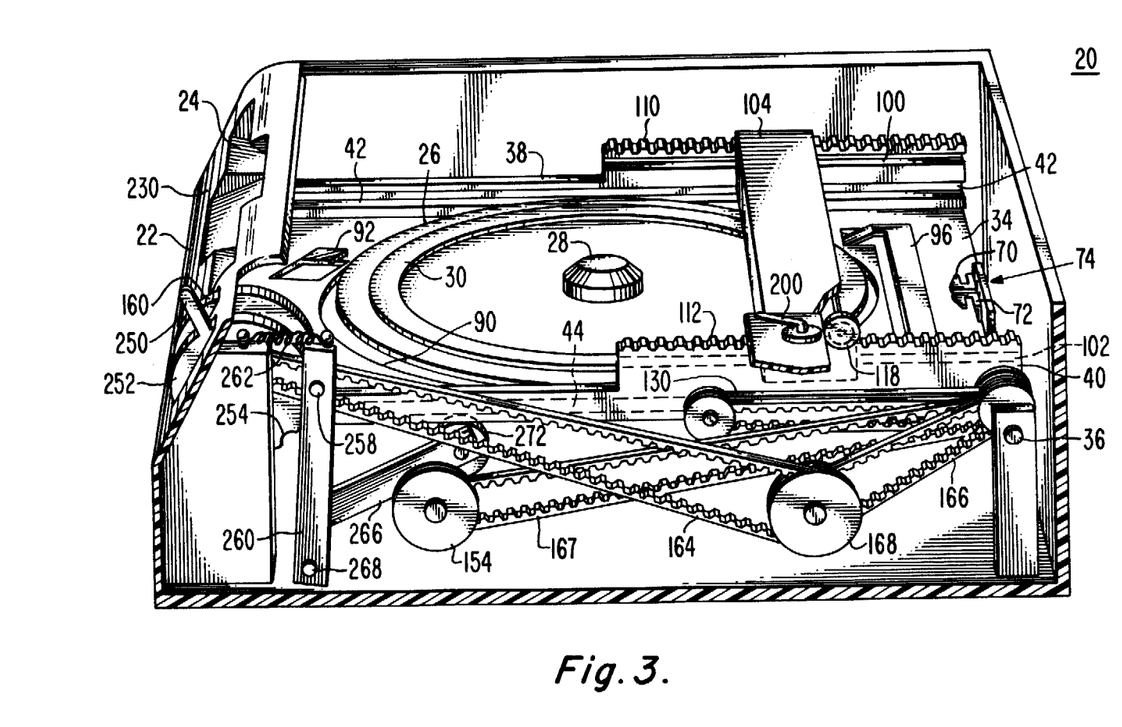
FIG. 3 is a perspective end view of the player of FIGS. 1 and 2, with the depressible platform being shown in the lowered position.

In FIGS. 1, 2 and 3, a video disc player 20 (incorporating the carriage translating mechanism of the aforesaid Stave application) includes a housing 22 which is provided with an input slot 24 at the front end thereof, through which a record caddy is inserted for loading an enclosed record into the player. A turntable 26 includes a record centering spindle 28, and a soft annular pad 30 for supporting the record. The turntable diameter is made less than the record diameter, and the soft annular pad supports the record in the grooved area.

The turntable 26 is driven by a motor 32 (FIG. 1) to rotate at a predetermined speed within preset limits (e.g., 450 rpm±0.01%). U.S. Pat. No. 3,912,283 (Hammond, et al.), discloses an alternate form of a turntable drive system.

A platform 34, mounted on a shaft 36 which is located at the non-input end of the housing 22, is subject to motion between an elevated position (FIG. 2) and a depressed position (FIG. 3). A pair of rails 38 and 40 are disposed on the platform 34. The rails have grooves 42 and 44 for guiding insertion of a caddy into the housing along a path. The front ends of the caddy guiding grooves are aligned with the input slot 24 when the platform is occupying the elevated position for permitting insertion of a caddy into the player.

Figures 4, 5, 6, 7, 8, 9:
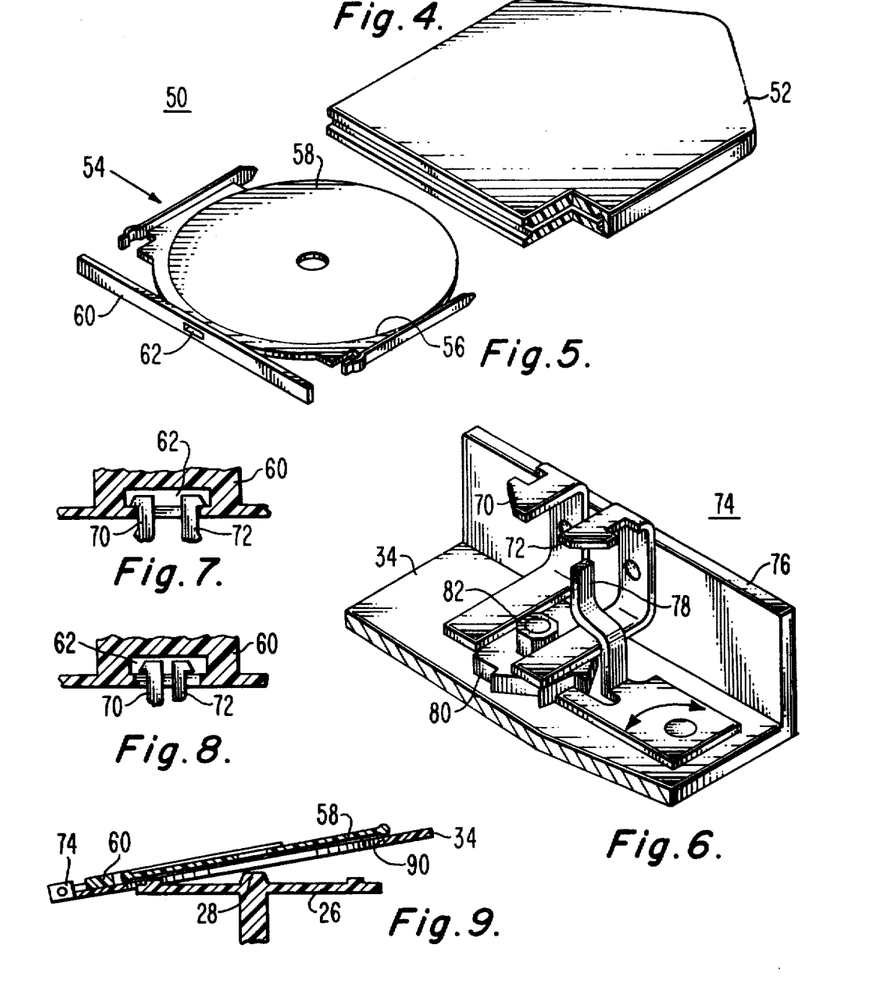
FIGS. 4 and 5 depict a record caddy, comprising a jacket and a record retaining member, suitable for use with the player of FIGS. 1-3.
FIG. 6 illustrates a record extracting mechanism disposed in the player of FIGS. 1-3.
FIGS. 7 and 8 show the operation of the record extracting mechanism of FIG. 6.
FIGS. 9 and 10 demonstrate the sequence involved in transferring a record, resting on the depressible platform of FIGS. 1-3, to the player turntable.

As shown in FIGS. 4 and 5, the record caddy 50 comprises an outer jacket 52 and a record retaining member 54 removably located within the jacket. The retaining member comprises (1) an annular portion 56, that encircles the enclosed record 58, and (2) a spine portion 60, which serves as a closure to keep dust and debris from entering the record enclosing cavity. The spine has an opening 62 into which the latch arms 70 and 72 of a record extracting mechanism 74 (FIG. 1) protrude during arrival of a record caddy at a fully inserted position in the player to effect record removal during subsequent caddy withdrawal.

The record extracting mechanism 74 is mounted on the platform 34. In the manner shown in FIG. 6, the extracting mechanism 74 includes latch arms 70 and 72 pivotally secured to a platform-mounted bracket 76. The latch arms are alternated between an open condition (FIGS. 6 and 7) and a closed condition (FIG. 8), in response to each caddy arrival at the fully inserted position in the player. The arrangement for rendering the extracting mechanism caddy responsive includes a pivotally-mounted actuating arm 78 disposed in the caddy path. The actuating arm advances a ratchet 80, carrying a square-shaped cam 82, through 45 degrees each time a cover arrives at a fully inserted position in the player. Each advancement of the square-shaped cam changes the condition of latch arms from the condition they occupied prior to cover insertion to the other condition thereof. Springs (not shown) are provided for returning the actuating arm to the rest position thereof, and to bias the latch arms into engagement with the square-shaped cam 82. A pawl (not shown) is provided to prevent the ratchet from rotating in the reverse direction when the actuating arm is returned to its rest position. U.S. Pat. No. 4,109,919 (Elliott, et al.) discloses a suitable caddy-actuated record extracting mechanism.

Figure 10:
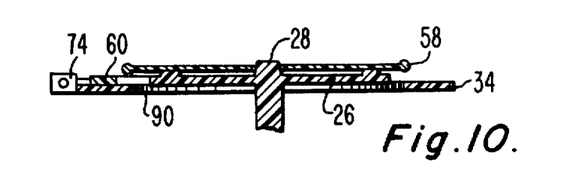

To load a record into the player, the latch arms 70 and 72 are disposed in the closed condition (FIG. 8), the platform 34 is disposed in the elevated position (FIG. 2) and an occupied caddy is inserted through the input slot 24 along the caddy guiding grooves 42 and 44. The latch arms enter the opening 62 in the spine 60 as the caddy reaches the fully inserted position in the player. The engagement of the caddy with the actuating arm 78 indexes the latch arms into the spread apart condition (FIG. 7), whereby the retaining member and the associated record are locked to the platform. Subsequent withdrawal of the caddy removes the record therefrom, thereby retaining the record in the player resting on the raised platform (FIG. 9). To transfer the retained record to the turntable, the platform is lowered to the depressed position (FIG. 10).

For record retrieval, the above sequence is reversed. The platform, with the record resting thereon, is raised (FIG. 9). The inner diameter of an opening 90 in the platform 34 is sufficiently less than the record diameter to positively insure lifting of the retained record during upward motion of the platform. The platform is provided with a set of depressible lifting pads 92, 93, 94, 95 and 96 (FIG. 1) to align the record resting thereon with the caddy guiding grooves 42 and 44 to cause return of the record into an empty caddy during insertion thereof into the player. As a caddy is loaded into the player, the leading edge thereof depresses the lifting pads to allow forward motion of the caddy. The engagement of the caddy with the actuating arm 78 reindexes the latch arms to the closed condition (FIG. 8), thereby freeing the record from the player. Subsequent caddy withdrawal removes the enclosed record therewith.

The rails 38 and 40 are further provided with a second set of grooves 100 and 102 (FIGS. 2 and 3) for guiding a carriage 104 along a second path parallel to the caddy path (front-and-back). The carriage is provided with a pair of projections (not shown), which are respectively received in the carriage guiding grooves.

A pickup cartridge 106, carrying a groove-riding stylus 107 at the end of a stylus arm 108, is installed in a compartment provided in the carriage 104 (FIG. 1). The carriage is translated during playback along the rails toward the turntable center (a direction opposite to the direction of caddy insertion) in correlation with the speed of rotation of the turntable in the manner hereinafter described. An armstretcher apparatus 109 oscillates the pickup stylus back-and-forth along the groove so as to offset cyclical errors in stylus/record relative velocity. U.S. Pat. No. 4,030,124 (Allen), discloses a pickup cartridge suitable for use with the player described herein. A suitable armstretcher apparatus is shown in U.S. Pat. No. 3,983,318 (Miller, et al.).

A pair of racks 110 and 112 are respectively secured to the platform rails 38 and 40. A shaft 114, carrying a set of pinions 116 and 118, is rotatably secured to the carriage 104 (FIG. 1). A respective one of the pinions engage a respective one of the racks to ensure that the carriage path lies radially of a turntable-supported record throughout the operating range thereof.

Prior to playback, the carriage is restored to a starting position. The resetting of the carriage to the starting position is done automatically when a caddy is inserted, for example, to retrieve a record, resting on the platform while it is disposed in the raised position, from the player. The location of the caddy path relative to the carriage path is such that a caddy engages the carriage during insertion thereof into the player. The player is dimensioned such that the arrival of the carriage-engaging caddy at the fully inserted position in the player coincides with the arrival of the engaged carriage at the starting position.

For playback, the platform, with a retained record resting thereon, is depressed to transfer the record to the turntable. The carriage is translated during playback along the rails in a direction opposite to the direction of caddy insertion in correlation with the speed of rotation of the turntable. In addition to normal correlated translation of the carriage during playback, the carriage is translatable in either direction at a speed independent of the speed of rotation of the turntable during active search.

The carriage drive mechanism includes an endless play belt 130, an endless search belt 132 and a carriage-mounted, mechanical toggle switch 134 (FIG. 1). The toggle switch selectively connects one of the two belts to the carriage to effect carriage translation by a selected one of the belts. The play belt is driven in correlation with the turntable rotational speed, and in a direction causing carriage translation toward the record center. The search belt is driven independent of the turntable rotational speed, and in either direction. The belts are driven in the manner described hereinafter. The play belt is disposed about a pair of pulleys 136 and 138, and the search belt is disposed about an additional set of pulleys 140 and 142. Pulleys 136 and 140 are loosely mounted on the platform shaft 36 for motion independent thereof. The other pulleys 138 and 142, serving as idling members, are freely mounted for rotation about a pin 144 secured to the platform 34, and extending parallel to the platform shaft 36. The respective locations of the pulleys are such that the belts lie along a path parallel to the carriage path.

The mechanisms for driving the two belts will now be described. As shown in FIG. 1, a turntable-driven pulley 150 and a thumbwheel-driven pulley 152 are also loosely mounted on the platform shaft 36 for motion independent thereof. The play belt driving pulley 136 and the search belt driving pulley 140 are respectively secured to the turntable-driven pulley 150 and the thumbwheel-driven pulley 152 for rotation therewith.

The turntable-driven pulley 150 is coupled to a pulley 154 which, in turn, is driven by the turntable drive motor 32 via a drive chain 156. The selection of proper gear ratios permits carriage translation in correlation with the radial motion of the groove-riding stylus during playback.

A serrated thumbwheel 160 is rotatably mounted in the housing 22, and has a portion, which is accessible to the user of the player through a slot in the front instrument panel 230 of the player. A pulley 162 is mounted coaxially with the thumbwheel for rotation therewith. The coaxially mounted pulley drives the thumbwheel-driven pulley 152 by means of endless belts 164 and 166 via an intermediate pulley 168. It will be seen that the speed of the bidirectional search belt is continuously variable over a range of speeds in either direction by utilizing the manually-actuated thumbwheel. All of the endless belts and the pulleys herein used are equipped with teeth to provide nonslip coupling.

An apparatus 170 (FIGS. 1 and 11) for causing motion of the pickup stylus between a lowered position, permitting engagement between the stylus and a turntable-supported record, and a raised position,, precluding stylus/record engagement, is mounted in the carriage 104. The pickup stylus is lowered for engagement with a turntable-supported record during playback and active search. The pickup stylus is raised when the player is in a pause mode and when the carriage reaches an end-of-play position.

Figure 11:
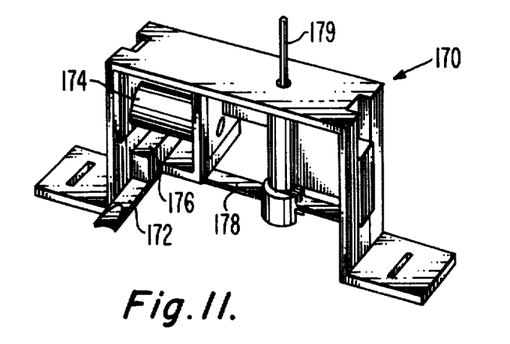
FIG. 11 illustrates a stylus lifting/lowering apparatus suitable for use with the player of FIGS. 1-3.

Essentially, as shown in FIG. 11, the stylus lifting/lowering apparatus 170 includes a stylus arm rest 172 mounted for motion between an elevated position and a depressed position. The stylus arm rest in the elevated position supports the stylus arm 108 (FIG. 1) in a manner precluding stylus/record contact. The stylus arm rest in the depressed position permits the stylus arm to occupy a lowered position. The lowered position of the stylus arm is such that the stylus/record contact is established when the carriage is in the over-record play position. An electromagnet 174 is energized to repel a permanent magnet 176 secured to the stylus arm rest to dispose the stylus arm rest in the depressed position. A leaf spring 178 secured to the stylus arm rest lifts the stylus 107 off the record when the electromagnet is de-energized. A selectively actuated plunger 179 depresses the stylus arm rest when actuated. U.S. Pat. No. 4,053,161 (Bleazey, et al.), discloses such stylus lifting/lowering apparatus.

Disposed in the carriage are pickup circuits coupled to the output of the groove-riding stylus for developing a signal representative of the information stored on the turntable-supported record. Signal processing circuits, coupled to the output of the pickup circuits, are located in the housing for developing a signal suitable for application to a television receiver for audio/visual presentation of the information stored on the record. U.S. Pat. No. 4,080,625 (Kawamoto, et al.), discloses suitable pickup circuits. U.S. Pat. No. 4,097,899 (Yu), illustratively describes signal processing circuits.

To obtain various special effects, the mechanical toggle switch 134 is thrown into an active search mode to connect the carriage to the variable speed, bidirectional search belt 132 to the exclusion of the constant speed, unidirectional play belt 130. It will be noted that in the active search mode, as well as in the play mode, the stylus lifting/lowering apparatus permits a stylus/- record engagement. To realize, for example, fast forward motion, the carriage is translated at a rapid rate in the forward direction by rotating the thumbwheel 160 at appropriate speed in the required direction, while the stylus is allowed to ride on the record. The reverse motion can be obtained by translating the carriage in the reverse direction (i.e., away from the turntable center or toward the starting position). To obtain stop motion effect, the carriage is allowed to remain stationary, thereby causing the groove-riding stylus to repetitively trace a selected set of groove convolutions.

The platform lifting/lowering mechanism will now be described in conjunction with FIGS. 1–3. A function selection lever 250 secured to a rotatably mounted wheel 252, extends through a slot provided in the front instrument panel of the player. The function selection lever is moved to the positions shown in FIGS. 2 and 3, respectively, to raise and lower the platform. In the raised position of the platform, the front ends of the caddy guiding grooves 42 and 44 are aligned with the input slot to permit caddy insertion and extraction. The depression of the platform, with a retained record resting thereon, effects transfer of the retained record to the turntable for playback. The function selection lever may also serve to shut off power to the player, for example, when it is shifted to a position beyond the caddy in/out position (FIG. 2).

The function selection wheel is provided with peripheral, axial notches 254 and 256 corresponding to the raised and lowered position of the platform. A detent 258, secured to a pivotally mounted lever 260, is received in one of the notches to releasably hold the function selection wheel in a selected one of the positions thereof. A spring 262 urges engagement between the detent and the periphery of the function selection wheel 252.

The linkage between the function selection lever and the platform includes a pair of spaced levers 264 and 266 secured to a rotatably mounted shaft 268. A set of platform-engaging rollers 270 and 272 are respectively disposed at the free ends of the spaced levers. As shown in FIG. 1, an endless toothed belt 274 is disposed about a toothed pulley 276, securely mounted on the shaft 268, and another toothed pulley 278, mounted coaxially with the function selection wheel for rotation therewith. The relative angular location of the spaced levers 264 and 266 is such that the motion of the function selection lever between the two positions causes corresponding motion of the platform between the elevated and the depressed position.

A rotatably-mounted dial 290 (FIG. 1), bearing an indicia indicative of the respective playing times associated with distance traveled by the carriage from a starting position, is visible through a readout window provided in the front instrument panel of the player. A cord 292 extends between the carriage 104 and the indicia bearing dial such that the displacement of the carriage along the guiding rails effects synchronized rotation of the dial. A torsion spring 294 is disposed about the axis of rotation of the dial such that it gets coiled during translation of the carriage away from the starting position, whereby energy is stored in the torsion spring. The coiled spring applies a force to the carriage in a sense urging carriage travel toward the starting position. The applied force aids resetting of the carriage to the starting position, when it is at a position other than the starting position during a caddy insertion. The cord 292 is passed over a grooved pulley 296 and another grooved pulley 298. The pulley 298 is coaxially mounted on the platform shaft. One end of the cord is fastened to the carriage-mounted block 180, and a portion at the other end thereof is wrapped around the stem portion of the dial. The stiffness of the torsion spring is selected to give the desired feel to the user of the player as he inserts a caddy into the player to restore the carriage to the starting position.

The input slot is covered with a flap for keeping dust and debris from entering the record chamber in the player. When the player is disposed in the caddy in/out mode (FIG. 2) by means of the function selection lever, the flap uncovers the input slot to allow caddy insertion and extraction. In other modes of the player, the flap remains closed.

It will be noted that both the caddy guiding grooves and the carriage guiding grooves are integrally molded with the platform to provide a single-main-frame construction. This permits a precise positioning of the caddy relative to the carriage and the carriage relative to the turntable throughout the operating range.

The mounting of the play belt driving pulley 136, the search belt driving pulley 140, the turntable-driven pulley 150, the thumbwheel-driven pulley 152 and the grooved pulley 298 on the platform shaft 36 permits platform motion without disturbing the rest of the player system.

Figure 12:
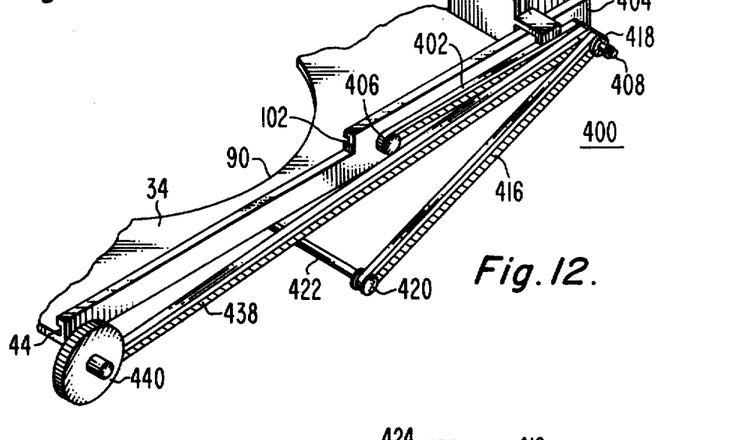
FIG. 12 illustrates a novel carriage translating mechanism pursuant to the principles of the present invention, and which can be substituted for the carriage translating mechanism disclosed in the abovesaid Stave application in the player of FIGS. 1-3.
Figure 13:
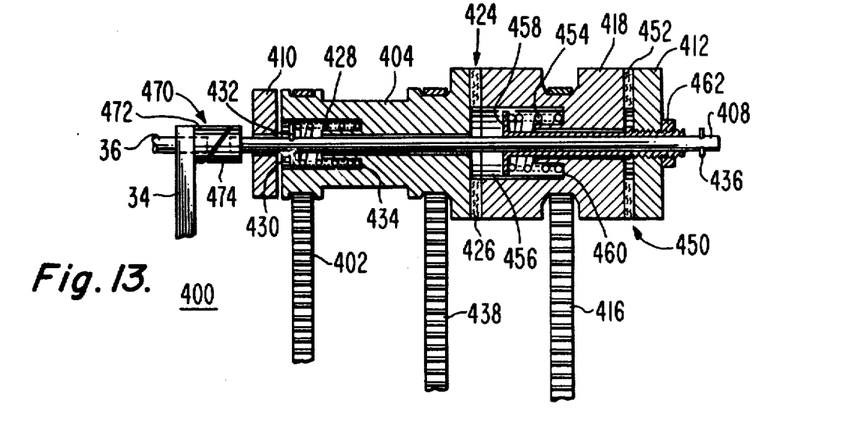
FIG. 13 shows a cross-sectional view of a portion of the carriage translating mechanism of FIG. 16.

Shown in FIGS. 12 and 13 is a novel carriage translating mechanism 400, built in accordance with the instant invention, for providing active scanning and special effect features. The novel carriage translating mechanism is suitable for substitution in place of the carriage translating mechanism of the aforesaid Stave application in the player of FIGS. 1–3. The advantages of the novel carriage translating mechanism are that it eliminates the need for separate play and search belts, and the need for clamping and unclamping of these belts.

As shown in FIGS. 12 and 13, the platform 34 is pivotally mounted about the shaft 36. It will be seen that the platform rail 40 is provided with the caddy guiding groove 44 and the carriage guiding groove 102. The pickup carriage 104 is slidably mounted on the platform for translation along a path lying substantially parallel to the caddy path in the manner hereinbefore discussed. For reasons of clarity, the rack and pinion arrangement (shown in FIGS. 1–3) for assuring radial translation of the pickup carriage is not illustrated in FIG. 16.

The novel carriage translating mechanism includes a common drive belt 402 disposed about a carriage driving pulley 404 and an idler pulley 406. The carriage driving pulley 404 is loosely mounted on a shaft 408 for rotation independent thereof. A pair of spaced members 410 and 412, secured to the housing of the player, support the shaft 408 coaxially with the platform shaft 36 for translation along a path parallel to the common axis. The idler pulley 406 is rotatably mounted about a pin secured to the platform. The carriage is fixedly secured to the common drive belt 402 by a clamp 414.

A first drive mechanism for translating the carriage during playback toward the turntable center at a speed correlated to the speed of rotation of the turntable (while the stylus lifting/lowering apparatus permits stylus/record engagement) includes an endless play belt 416 disposed about a turntable driven pulley 418 and a second idler pulley 420. The turntable driven pulley 418 is loosely mounted on the coaxial shaft 408 for motion independent thereof. The idler pulley 420 is driven by the turntable motor, via another drive chain 422, to rotate at a speed which causes the carriage to move in synchronism with the groove-riding pickup stylus during playback. The turntable driven pulley 418 drives the carriage driving pulley 404 via a slip clutch 424 (FIG. 13). The slip clutch 424 comprises a friction plate 426 fixedly secured to the turntable driven pulley 418 and a coil spring 428 disposed about the coaxial shaft 408 to urge engagement between the carriage driving pulley 404 and the friction plate. The coil spring 428 is seated in a recess 430 provided in the carriage driving pulley 404, and is interposed between a retainer 432 securely mounted on the coaxial shaft 408 and a shoulder portion 434 of the recess. A second retainer 436 is secured at the other end of the coaxial shaft 408 to limit axial movement thereof within a given range.

A second drive mechanism for translating the carriage (during, for example, active searching) toward and away from the turntable center at a speed independent of the turntable rotational speed (while the stylus lifting/lowering apparatus allows stylus/record engagement) includes an endless search belt 438 disposed about another portion of carriage driving pulley 404 and a pulley (not shown) mounted coaxially with a rotatably mounted, serrated thumbwheel 440 for rotation therewith. All the endless belts and pulleys herein used are equipped with teeth to provide a nonslip coupling between the respective members.

For active scanning, the carriage 104 can be translated at a speed variable over a range of speeds, and in either direction, by appropriately turning the thumbwheel 440 (while stylus/record engagement is permitted by the stylus lifting/lowering apparatus). The slip clutch 424 allows wresting of control of the common drive belt 402 by the thumbwheel 440, from the first drive mechanism, when the thumbwheel is manually turned. Additionally, the slip clutch permits restoration of the carriage 104 to the starting position, when the carriage is at a position other than the starting position, during a caddy insertion.

It is desirable that translation of the carriage toward the turntable center by virtue of the first drive mechanism resumes upon cessation of operation of the thumbwheel without delay due to effects of backlash in the first drive mechanism. Any delay in resumption of the normal tracking movement of the carriage upon cessation of active searching is annoying to the listener/viewer. To provide a substantially instant resumption of playback, a drag mechanism 450 is provided. The drag mechanism 450 comprises a second friction plate 452 fixedly secured to the support member 412 and a second coil spring 454 disposed about the coaxial shaft 408 to urge contact between the turntable driven pulley 418 and the friction plate. The coil spring 454 is seated in a cavity 456 provided in the turntable driven pulley 418, and is interposed between a flange portion of an adjustable retaining sleeve 458 and a base portion 460 of the cavity. The position of the retaining sleeve 458 with respect to the support member 412, and hence the force with which the turntable driven pulley 418 is applied against the friction plate 452, is variably adjusted by means of a nut 462 cooperating with the peripheral threads disposed on the stem portion of the retaining sleeve. The applied force is adjusted to a level such that the drag torque (due to friction between the turntable driven pulley 418 and the friction plate 452) exceeds the torque developed between the carriage driving pulley 404 and the turntable driven pulley via the slip clutch 424, thereby preventing reverse rotation of the turntable driven pulley due to effects of backlash, when the carriage driving pulley is rotated in the reverse direction by the thumbwheel 440 to cause the carriage to move away from the turntable center. The normal translation of the carriage is hence instantaneously resumed without delay when the thumbwheel 440 is released.

In such players, where the caddy pushes the carriage back to the starting position, it is desirable, as previously indicated, to reduce the force required to reset the carriage, and to provide a neutral, free flowing feel to the user of the player during such caddy insertion. The dial mechanism hereinbefore disclosed serves to, in addition to indicating the radial position of the carriage, aid restoration of carriage to the starting position during a caddy insertion. When the novel carriage translating mechanism 400 is employed in place of the carriage translating mechanism of the aforesaid Stave application in the player of FIGS. 1-3, the thumbwheel 440 which is fixedly coupled to the carriage 104 can be marked with appropriate indicia, and be used to indicate the radial position of the carriage instead of the above-mentioned dial mechanism. In such a case, the dial mechanism may be eliminated altogether. A mechanism, suitable for use in such a player, for aiding carriage restoration during a caddy insertion will now be described.

As shown in FIG. 13, the aiding mechanism 470 comprises a first cam member 472 secured to the platform shaft 36 and a second, juxtaposed cam member 474 fixedly mounted on the coaxial shaft 408. The construction and location of the cam members are such that when the platform 34 is raised to the elevated position (FIG. 2), for example, to retrieve a record from the player, the platform-mounted cam member 472 allows the cam member 474 to shift to the left, as viewed at FIG. 13, whereby the clutch spring 428 is caused to relax reducing the slip clutch engagement force. The reduction in slip clutch engagement force permits slippage between the carriage driving pulley 404 and the turntable driven pulley 418 during restoration of the carriage by the caddy to the starting position when the platform is depressed, for example, to transfer a retained record to the turntable for playback, the slip clutch automatically reengages to provide the required carriage driving torque during playback.

Filed concurrently herewith are the following U.S. patent applications, Ser. No. 964,531,: (1) application of L. A. Torrington, entitled "VIDEO DISC PLAYER", (2) application, Ser. No. 964,537, of L. A. Torrington and J. A. Allen, entitled "VIDEO DISC PLAYER HAVING UNITARY RECORD HANDLING PLATFORM CONSTRUCTION", (3) application, Ser. No. 964,536, of J. A. Allen, entitled "CARRIAGE TRANSLATING APPARATUS FOR VIDEO DISC PLAYER", (4) application, Ser. No. 964,534, of F. R. Stave, entitled "VIDEO DISC PLAYER HAVING MANUAL SCANNING FACILITY", (5) application, Ser. No. 964,535, of F. R. Stave, entitled "APPARATUS FOR FACILITATING CARRIAGE RETURN IN VIDEO DISC PLAYER", (6) application, Ser. No. 964,532, of F. R. Stave, entitled "VIDEO DISC PLAYER HAVING RECORD SIDE IDENTIFICATION APPARATUS", (7) application, Ser. No. 964,533, of C. F. Coleman, entitled "VIDEO DISC PLAYER HAVING MODULAR CONSTRUCTION", (8) application, Ser. No. 964,530, of L. A. Torrington, entitled "MANUAL SCANNING MECHANISM FOR VIDEO DISC PLAYER", (9) application, Ser. No. 964,529, of L. D. Huff, entitled "TOGGLE MECHANISM FOR VIDEO DISC PLAYER", (10) application, Ser. No. 964,528, of L. A. Torrington, entitled "RECORD SIDE IDENTIFICATION APPARATUS FOR VIDEO DISC PLAYER", (11) application, Ser. No. 964,527, of L. A. Torrington and L. D. Huff, entitled "CONSTANT DRAG CARRIAGE TRANSLATING MECHANISM FOR VIDEO DISC PLAYER", (12) application, Ser. No. 964,633, of L. A. Torrington, entitled "VIDEO DISC PLAYER HAVING ADJUSTABLE END-OF-PLAY SWITCH", and (13) application, Ser. No. 964,643, of C. F. Coleman and N. L. Farley, entitled "CADDY-ACTUATED DECLUTCHING MECHANISM FOR VIDEO DISC PLAYER". Reference may be made to these applications for explanation of video disc player features that may advantageously be employed with the present invention.

What is claimed is:

1. A player for use with a record caddy; said player comprising:
   (A) a housing having an input slot into which a caddy is inserted along a path;
   (B) a turntable mounted in said housing for centering and supporting said record;
   (C) drive means mounted in said housing for rotating said turntable;
   (D) a platform mounted in said housing, and subject to motion between (1) an elevated position, whereat said platform is aligned with said input slot, and (2) a position depressed relative to said turntable;
   (E) a record extracting mechanism for removing said record from said caddy during withdrawal thereof subsequent to an occupied caddy arrival at a fully inserted position in said housing, thereby retaining said record in said housing resting on said platform disposed in said elevated position;
   (F) means for causing motion of said platform between said elevated position and said depressed position; wherein motion of said platform, having said retained record resting thereon, to said depressed position effects transfer of said retained record to said turntable; wherein subsequent motion of said platform to said elevated position lifts said turntable-supported record to a raised position for retrieval thereof into an empty caddy, when said empty caddy is inserted into said housing while said platform, with said retained record resting thereon, is disposed in said elevated position;
   (G) a signal pickup for recovering prerecorded information from a turntable-supported record during playback;
   (H) a carriage for supporting said signal pickup;
   (I) means mounted on said platform for guiding said carriage in said housing along a second path lying parallel to said path of caddy insertion; the location of said carriage path relative to said caddy path being such that said caddy engages said carriage during a caddy insertion into said housing;
   (J) carriage translating means mounted to said platform, and secured to said carriage;
   (K) means for utilizing said carriage translating means during playback for translating said carriage along said guiding means in correlation with the rotation of said turntable and away from a starting position in a direction opposite to the direction of said caddy insertion while said platform is disposed in said depressed position; said utilizing means including coupling means interposed between said carriage translating means and a carriage drive means; and
   (L) means responsive to motion of said platform to said elevated position for disabling said coupling means, whereby return of said carriage to said starting position can be effected, with freedom from interference by said carriage drive means, when said carriage is at a position other than at said starting position during a caddy insertion.

2. A player in accordance with claim 1 further including a second means for utilizing said carriage translating means for translating said carriage toward and away from said starting position at a speed independent of the speed of rotation of said turntable; wherein said coupling means interposed between said carriage translating means and said turntable drive means comprises slip clutch means, whereby wresting of control of said carriage translating means from said first-mentioned utilizing means by said second utilizing means is allowed by said slip clutch means upon activation of said second utilizing means; wherein said slip clutch means comprises a pair of friction surfaces and means for applying a force in a sense urging said friction surfaces into engagement; wherein said disabling means includes means responsive to motion of said platform for reducing said clutch engagement force when said platform is raised to said elevated position, thereby permitting slippage between said friction surfaces during restoration of said carriage to said starting position by said caddy.

3. A player as defined in claim 2 wherein said platform is pivotally mounted about a shaft, which is located toward the end of said housing remote from said input slot, for arcuate motion between said elevated position and said depressed position; wherein said carriage translating means includes an endless drive belt secured to said carriage and disposed about an idler pulley and a carriage driving pulley such that said drive belt is disposed parallel to said carriage path; said carriage driving pulley being loosely mounted on said platform shaft for motion independent of said shaft; said idler pulley being secured to said platform for rotation about an axis disposed parallel to said shaft; wherein said first-mentioned utilizing means includes a pulley driven by said turntable drive means, and also loosely mounted on said platform shaft for motion independent of said shaft; wherein one of said friction surfaces is provided by said carriage driving pulley, and the other of said friction surfaces is provided by said turntable-driven pulley; wherein said force applying means comprises a spring interposed between said carriage driving pulley and a flange secured to said platform shaft; wherein said force reducing means comprises means, responsive to arcuate motion of said platform, for varying the separation between said flange and said carriage driving pulley in a manner relaxing said spring when said platform is raised to said elevated position, whereby said slippage between said friction surfaces is permitted.

4. A player as defined in claim 3 wherein said platform shaft is subject to translation in a direction parallel to the axis thereof; wherein said separation varying means comprises means for displacing said platform shaft to vary the position of said flange with respect to said carriage driving pulley.

5. A player as defined in claim 4 wherein said shaft displacing means comprises a first cam member fixedly secured to said platform and a second cam member fixedly secured to said platform shaft; the location of said first cam member with respect to said second cam member being such that the arcuate motion of said platform causes position varying displacement of said platform shaft.

6. A player as defined in claim 3 wherein one of said friction surfaces is provided by an annular friction ring secured to one of said carriage driving pulleys and said turntable-driven pulley.

7. A player for use with a record caddy; said player comprising:
- (A) a housing having an input slot into which a caddy is inserted along a path;
- (B) a turntable mounted in said housing for centering and supporting said record;
- (C) means mounted in said housing for rotating said turntable;
- (D) a record extracting mechanism for removing said record from said caddy during withdrawal thereof subsequent to an occupied caddy arrival at a fully inserted position in said housing, thereby retaining said record in said housing;
- (E) a signal pickup for recovering prerecorded information from a turntable-supported record during playback;
- (F) a carriage for supporting said signal pickup;
- (G) means for guiding said carriage in said housing along a second path lying parallel to said path of caddy insertion; the location of said carriage path relative to said caddy path being such that said caddy engages said carriage during a caddy insertion into said housing;
- (H) carriage translating means secured to said carriage;
- (I) means for utilizing said carriage translating means during playback for translating said carriage along said guiding means in correlation with the rotation of said turntable and away from a starting position in a direction opposite to the direction of said caddy insertion; said utilizing means including coupling means interposed between said carriage translating means and a carriage drive means; and
- (J) means for rendering said coupling means disabled during a caddy insertion, whereby return of said carriage to said starting position can be effected, with freedom from interference by said carriage drive means, when said carriage is at a position other than at said starting position during said caddy insertion.

8. A player in accordance with claim 7 further including a second means for utilizing said carriage translating means for translating said carriage toward and away from said starting position at a speed independent of the speed of rotation of said turntable; wherein said coupling means interposed between said carriage translating means and said turntable drive means comprises slip clutch means, whereby wresting of control of said carriage translating means from said first-mentioned utilizing means by said second utilizing means is allowed by said slip clutch means upon activation of said second utilizing means; wherein said slip clutch means comprises a pair of friction surfaces and means for applying a force in a sense urging said friction surfaces into engagement; wherein said rendering means includes means for reducing said clutch engagement force, thereby permitting slippage between said friction surfaces during restoration of said carriage to said starting position by said caddy.

9. A player as defined in claim 8 further including a platform mounted in said housing, and subject to motion between (a) an elevated position, whereat said platform is aligned with said input slot, and (b) a position depressed relative to said turntable; said platform in said elevated position supporting a retained record; said player additionally including means for causing motion of said platform between said elevated position and said depressed position; wherein motion of said platform, having said retained record resting thereon, to said depressed position effects a transfer of said retained record to said turntable; wherein subsequent motion of said platform to said elevated position lifts said turntable-supported record to a raised position for retrieval thereof into an empty caddy, when said empty caddy is inserted into said housing while said platform, with said retained record resting thereon, is disposed in said elevated position; said player further including means responsive to said motion of said platform to said elevated position for activating said rendering means, whereby return of said carriage to said starting position can be effected, with freedom from interference by said turntable drive means, when said carriage is at a position other than at said starting position during a caddy insertion.

* * * * *